US011378328B2

(12) United States Patent
Amorim et al.

(10) Patent No.: US 11,378,328 B2
(45) Date of Patent: *Jul. 5, 2022

(54) POLYMER TRIM BREAKER HAVING GAS-BLOCKING FLAKES AND AN EPOXY COATING (71) Applicant: WHIRLPOOL CORPORATION, Benton Harbor, MI (US)

(72) Inventors: Paulo Henrique Amorim, Joinville (BR); Vincent D. Csapos, Hamilton, MI (US); Maurizio Longhi, Stevensville, MI (US); Devidas B. Raskar, St. Joseph, MI (US); Fabio F. Ribas, Joinville (BR)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/066,073

(22) Filed: Oct. 8, 2020

(65) Prior Publication Data

US 2021/0025646 A1 Jan. 28, 2021

Related U.S. Application Data (62) Division of application No. 16/520,572, filed on Jul. 24, 2019, now Pat. No. 10,837,697.

(Continued)

(51) Int. Cl.
*F25D 23/06* (2006.01)
*B29C 33/38* (2006.01)
(Continued)

(52) U.S. Cl.
CPC ........ *F25D 23/067* (2013.01); *B29C 33/3842* (2013.01); *B29C 45/0001* (2013.01); *B29C 45/0046* (2013.01); *F25D 23/082* (2013.01); *B29K 2105/18* (2013.01); *B29L 2031/7622* (2013.01); *F25D 2201/14* (2013.01)

(58) Field of Classification Search
CPC .. F25D 23/082; F25D 23/085; F25D 2201/14; B29C 45/0045; B29K 2105/18
See application file for complete search history.

(56) References Cited

U.S. PATENT DOCUMENTS 2,679,944 A 6/1954 Morton
2,745,173 A * 5/1956 Janos ............... E04C 2/292
65/483

(Continued)

FOREIGN PATENT DOCUMENTS

WO 2017180126 10/2017

*Primary Examiner* — Daniel J Rohrhoff
(74) *Attorney, Agent, or Firm* — Price Heneveld LLP (57) ABSTRACT A refrigerator includes an inner liner, an outer wrapper and a trim breaker that extends between the inner liner and the outer wrapper to define an insulated structural cabinet. The trim breaker includes a plurality of gas-blocking flakes, wherein each gas-blocking flake includes a longitudinal axis that extends substantially parallel with an elongated surface of the respective gas-blocking flake. The longitudinal axis and the elongated surface of each corresponding gas-blocking flake is oriented to be substantially parallel with a portion of an outer surface of the trim breaker located near the respective gas-blocking flake.

15 Claims, 9 Drawing Sheets

Related U.S. Application Data (60) Provisional application No. 62/785,895, filed on Dec. 28, 2018, provisional application No. 62/753,502, filed on Oct. 31, 2018.

(51) Int. Cl.
    *B29C 45/00*     (2006.01)
    *F25D 23/08*     (2006.01)
    *B29K 105/18*    (2006.01)
    *B29L 31/00*     (2006.01)

(56) References Cited

U.S. PATENT DOCUMENTS

| | | | |
|---|---|---|---|
| 2,792,959 A | 5/1957 | Diamond et al. | |
| 2,809,764 A | 10/1957 | Diamond | |
| 3,338,451 A | 8/1967 | Kesling | |
| 3,632,012 A | 1/1972 | Kitson | |
| 5,107,649 A | 4/1992 | Benson et al. | |
| 5,368,851 A | 11/1994 | Mandel | |
| 5,424,119 A * | 6/1995 | Phillips | B29C 41/24 428/328 |
| 5,532,034 A * | 7/1996 | Kirby | B32B 27/00 428/69 |
| 5,869,407 A * | 2/1999 | Rusek, Jr. | B32B 1/06 442/140 |
| 6,266,941 B1 * | 7/2001 | Nishimoto | F25D 23/06 52/788.1 |
| 6,464,312 B1 | 10/2002 | Tenhundfeld | |
| 6,938,968 B2 * | 9/2005 | Tanimoto | B65D 81/18 312/406 |
| 10,077,342 B2 | 9/2018 | An et al. | |
| 10,514,198 B2 * | 12/2019 | Liu | B32B 27/36 |
| 10,612,834 B2 | 4/2020 | Allard et al. | |
| 10,837,697 B2 * | 11/2020 | Amorim | B29C 45/0001 |
| 2005/0175809 A1 | 8/2005 | Hirai et al. | |
| 2016/0258671 A1 | 9/2016 | Allard et al. | |
| 2018/0311884 A1 * | 11/2018 | Allard | B29C 51/02 |

* cited by examiner

POLYMER TRIM BREAKER HAVING GAS-BLOCKING FLAKES AND AN EPOXY COATING

CROSS-REFERENCE TO RELATED APPLICATIONS

The present application is a divisional of U.S. patent application Ser. No. 16/520,572 filed Jul. 24, 2019, entitled POLYMER TRIM BREAKER HAVING GAS-BLOCKING FLAKES AND AN EPOXY COATING, which claims priority to and the benefit under 35 U.S.C. § 119(e) of U.S. Provisional Patent Application No. 62/753,502, filed on Oct. 31, 2018, entitled POLYMER AND MICA TRIM BREAKER HAVING AN EPOXY COATING; and U.S. Provisional Patent Application No. 62/785,895, filed on Dec. 28, 2018, entitled POLYMER AND MICA TRIM BREAKER HAVING AN EPOXY COATING, the entire disclosures of which are hereby incorporated herein by reference.

FIELD OF THE DEVICE

The device is in the field of structural cabinets for appliances and more specifically, a trim breaker for a cabinet of an appliance, where the trim breaker includes mica particles and an epoxy coating for limiting gas permeation through the trim breaker.

BACKGROUND

Cabinets for appliances typically include a trim breaker that extends between the inner liner and outer wrapper. The trim breaker helps to contain an insulating material within a cavity of the cabinet.

SUMMARY

In at least one aspect, a refrigerator includes an inner liner, an outer wrapper and a trim breaker that extends between the inner liner and the outer wrapper to define an insulated structural cabinet. The trim breaker includes a plurality of gas-blocking flakes, wherein each gas-blocking flake includes a longitudinal axis that extends substantially parallel with an elongated surface of the respective gas-blocking flake. The longitudinal axis and the elongated surface of each corresponding gas-blocking flake is oriented to be substantially parallel with a portion of an outer surface of the trim breaker located near the respective gas-blocking flake.

In at least another aspect, the trim breaker includes a base material that defines an outer surface. A plurality of gas-blocking flakes are integrated into the base material. Each gas-blocking flake of the plurality of gas-blocking flakes includes a longitudinal axis that extends substantially parallel with an elongated surface of the respective gas-blocking flake. The longitudinal axis and the elongated surface of each corresponding gas-blocking flake is oriented to be substantially parallel with a portion of the outer surface of the base material located near the respective gas-blocking flake.

In at least another aspect, a method for forming a trim breaker includes disposing gas-blocking flakes into a polymer material to form an injection molding material. A mold is formed that defines a forming cavity, wherein the mold includes a plurality of gating structures. The injection molding material is injected into the mold via the gating structures. A flow of the injection molding material is directed into the mold. The gating structures produce a flow of the injection molding material that is substantially parallel with an interior surface that defines the forming cavity. The flow of the injection molding material produces an aligned configuration of the gas-blocking flakes that is substantially parallel with the interior surface of the forming cavity to define the trim breaker.

These and other features, advantages, and objects of the present device will be further understood and appreciated by those skilled in the art upon studying the following specification, claims, and appended drawings.

DETAILED DESCRIPTION OF EMBODIMENTS

Figure 1:
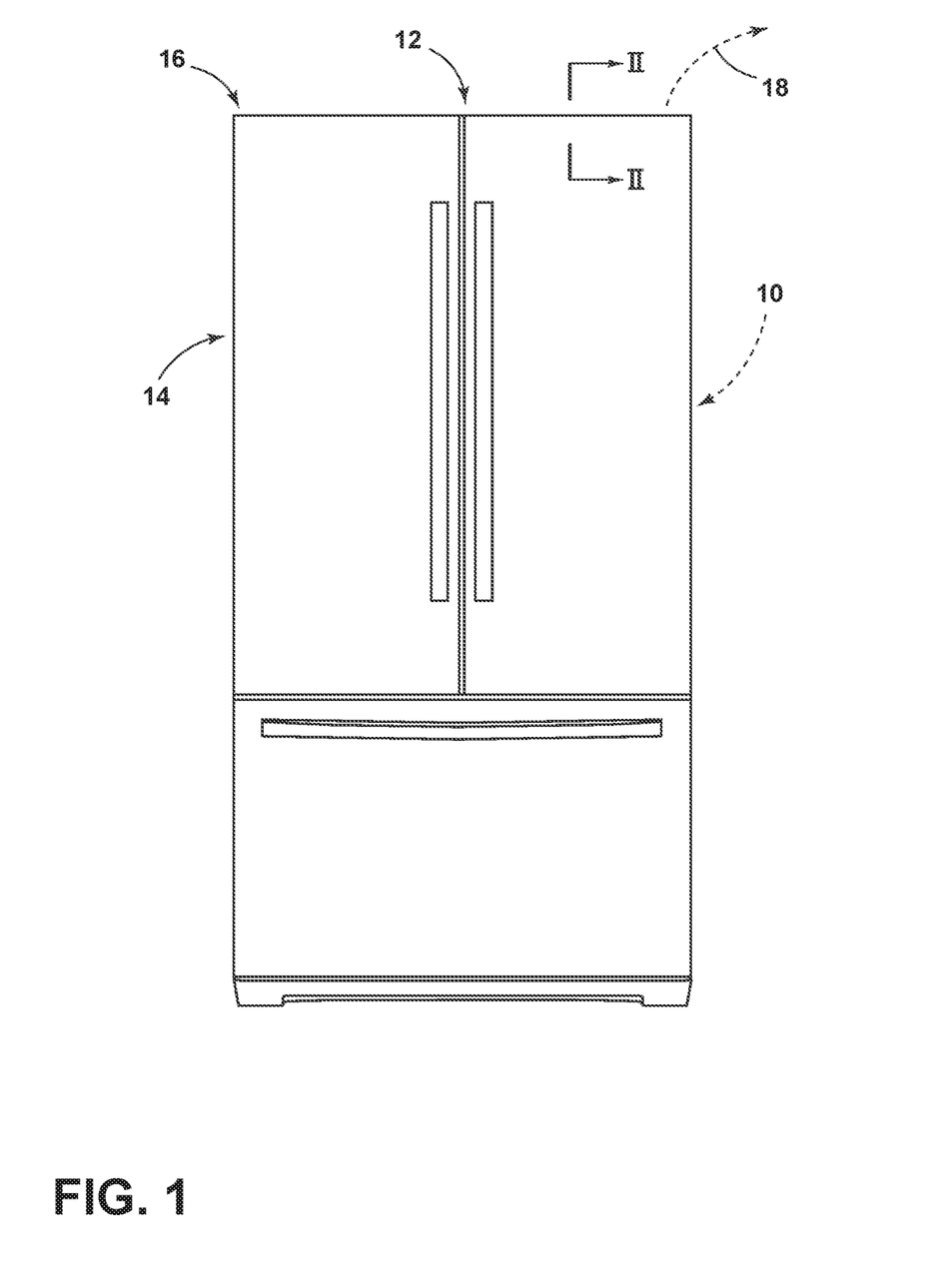
FIG. 1 is a front perspective view of an appliance incorporating an aspect of the trim breaker having the gas-blocking particles and the epoxy coating.
Figure 2:
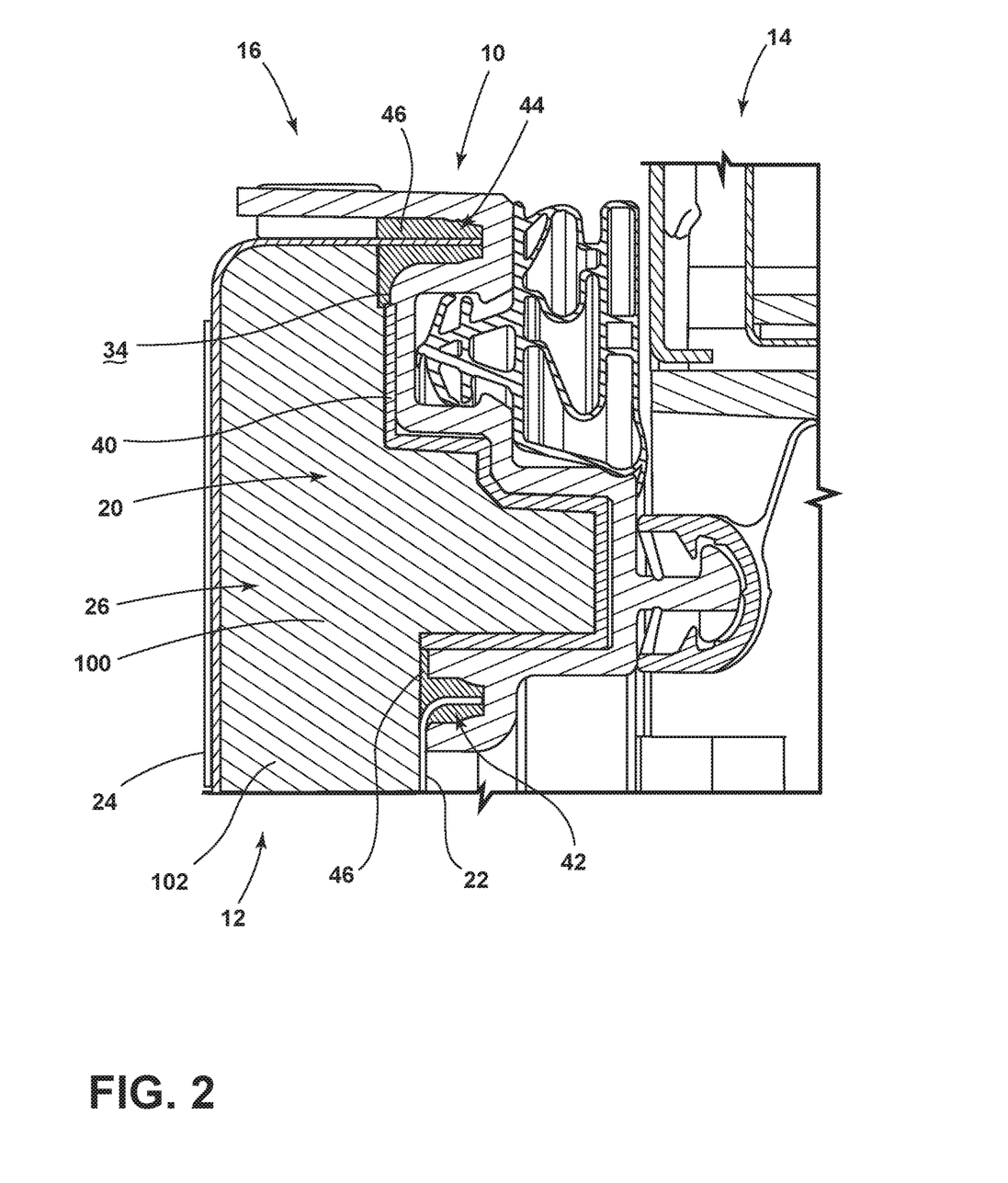
FIG. 2 is a cross-sectional view of the appliance of FIG. 1 taken along line III-Ill.
Figure 3:
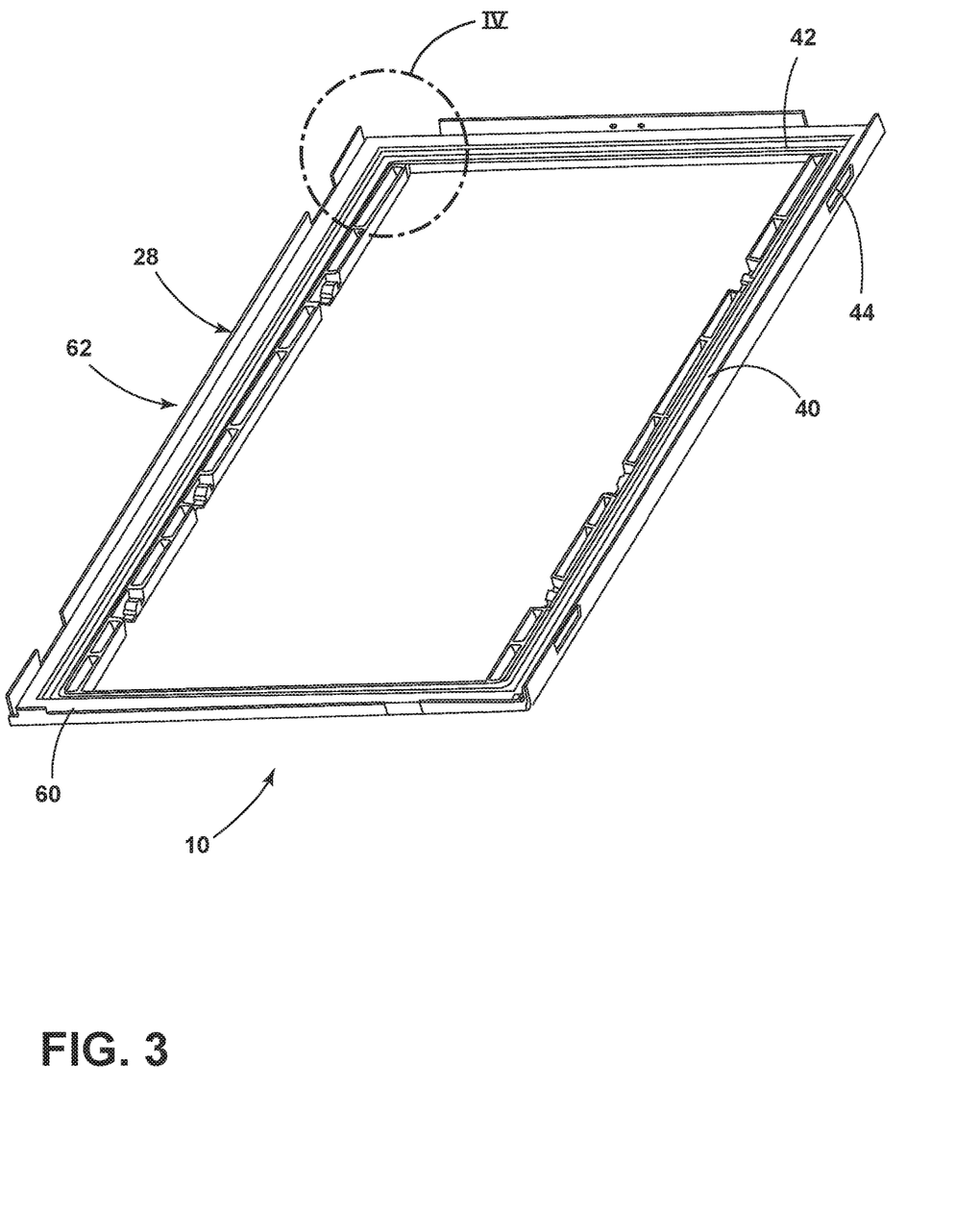
FIG. 3 is a perspective view of the trim breaker incorporating the gas-blocking flakes and the epoxy coating.
Figure 4:
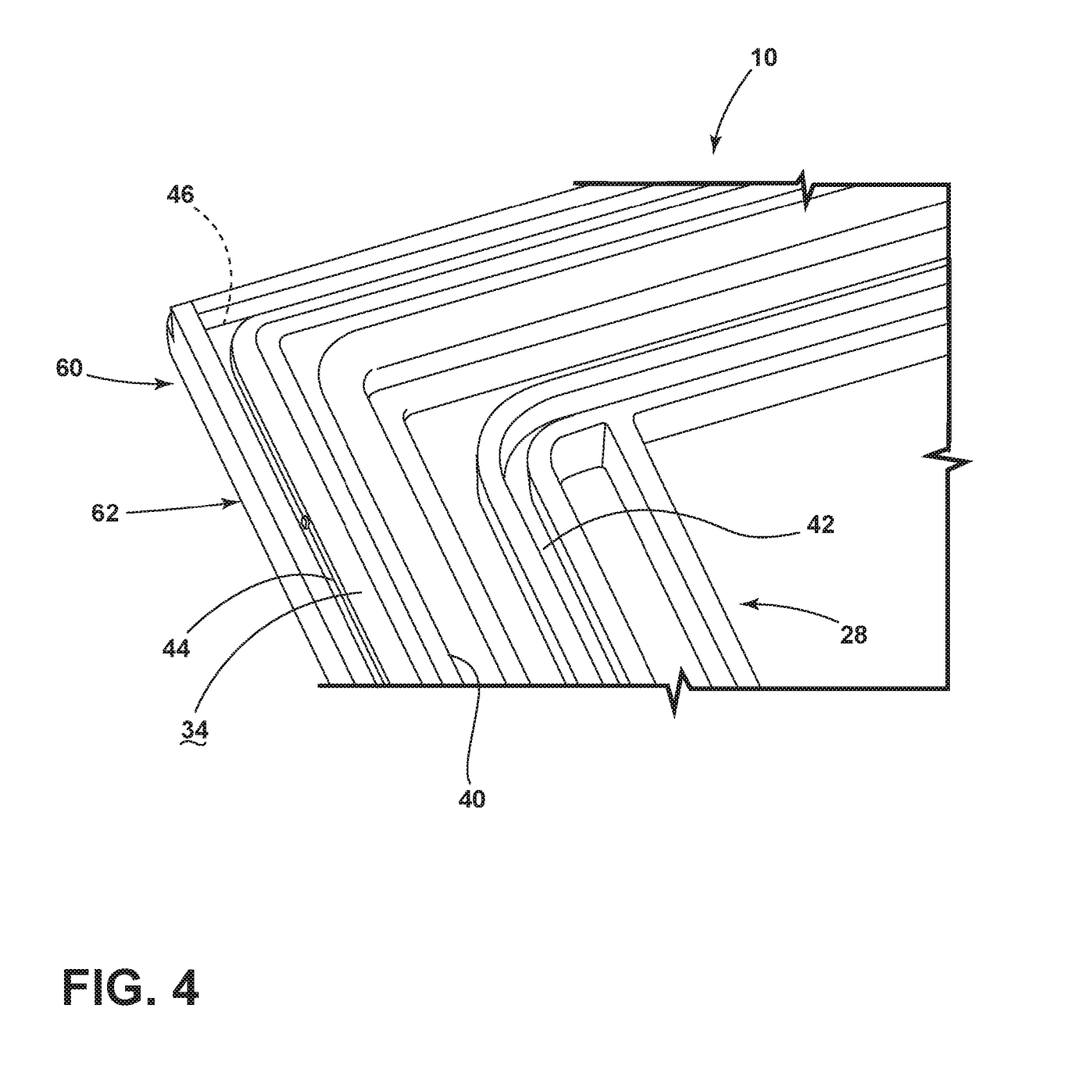
FIG. 4 is an enlarged perspective view of the trim breaker of FIG. 3 taken at area IV.
Figure 5:
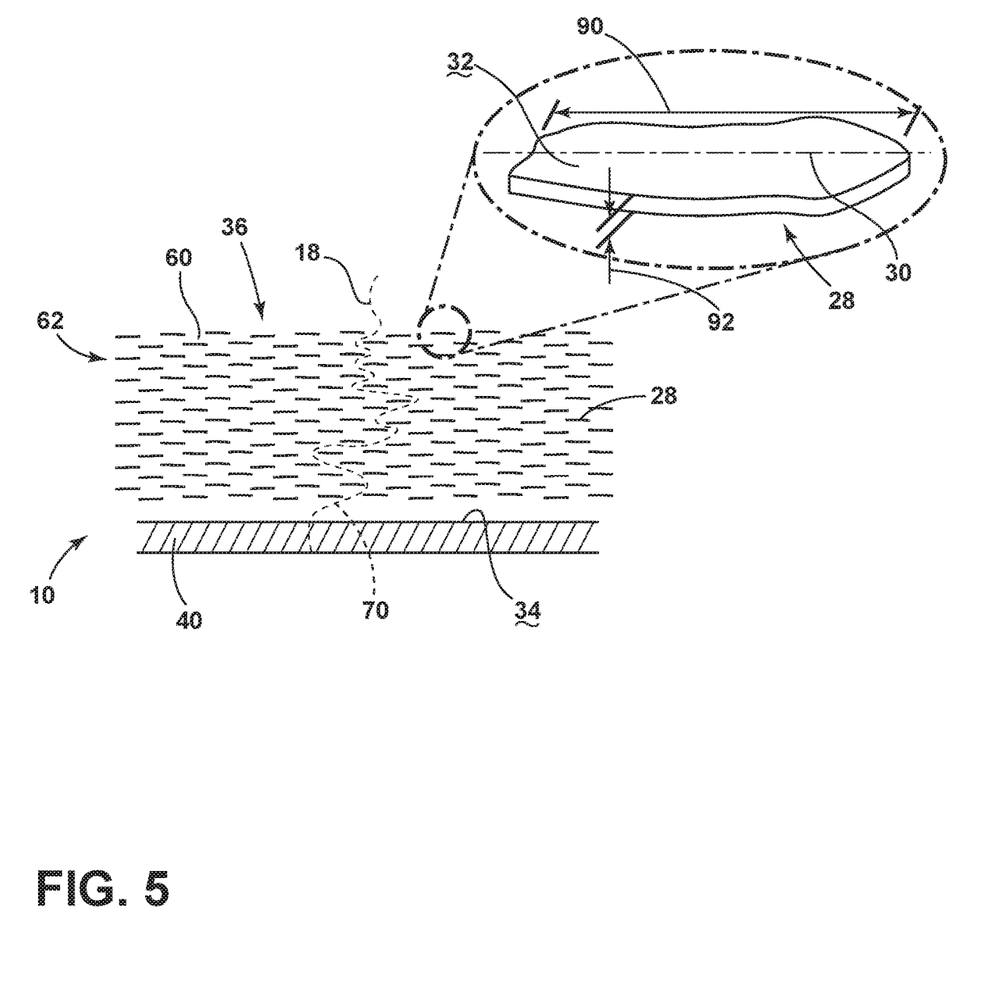
FIG. 5 is a schematic cross-sectional view of the trim breaker of FIG. 4 showing the gas-blocking flakes and the epoxy coating.
Figure 6:
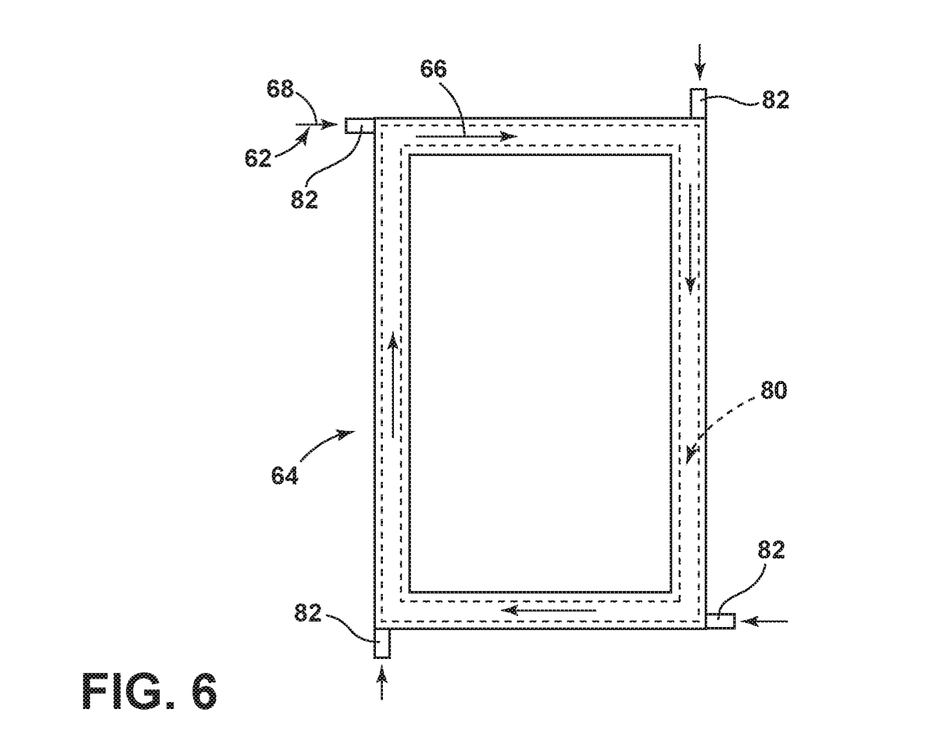
FIG. 6 is a schematic view of a mold used to form the trim breaker having the gas-blocking flakes incorporated therein.
Figure 7:
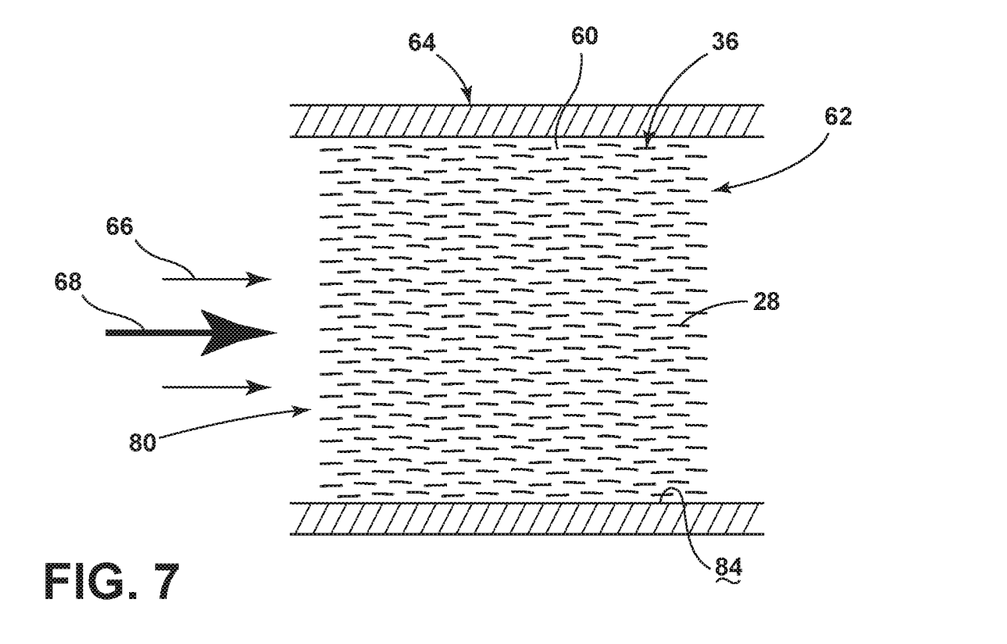
FIG. 7 is a schematic cross-sectional view of the mold of FIG. 6 showing a flow of the polymer material to achieve the aligned configuration of the gas-blocking flakes.
Figure 8:
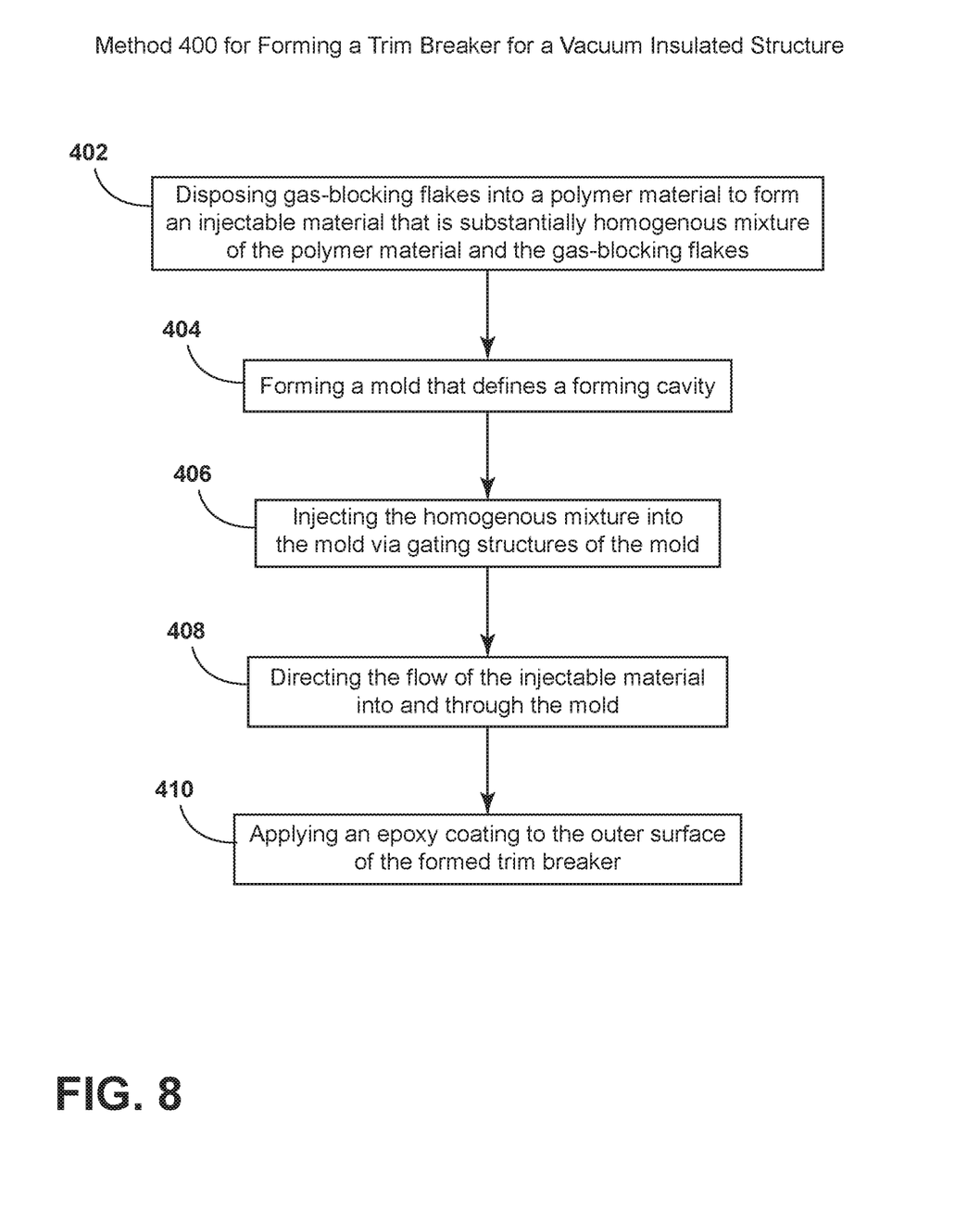
FIG. 8 is a schematic flow diagram illustrating a method for forming a trim breaker for use in a vacuum insulated structure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With respect to FIGS. 1-5, reference numeral 10 refers to a trim breaker that is incorporated within a structural cabinet 12 for an appliance 14, typically a refrigerator, freezer, oven or other similar appliance 14. Typically, the structural cabinet 12 defines a vacuum insulated structure 16 where gas 18 is evacuated from an interior cavity 20 defined within the structural cabinet 12. According to various aspects of the device, the appliance 14 includes an inner liner 22, an outer wrapper 24 and the trim breaker 10 that extends between the inner liner 22 and the outer wrapper 24 to define the insulated structural cabinet 12. The cabinet 12 defines an interior cavity 20 that is substantially maintained at an at least partial vacuum 26. The trim breaker 10 includes a plurality of gas-blocking flakes 28 incorporated within a base material 36 that defines the material of the trim breaker 10. Each gas-blocking flake 28 includes a longitudinal axis 30 that extends substantially parallel with an elongated surface 32 of each of the respective gas-blocking flakes 28. The longitudinal axis 30 and the elongated surface 32 of each corresponding gas-blocking flake 28 is oriented to be substantially parallel with a portion of an outer surface 34 of the trim breaker 10 located near that corresponding gas-blocking flake 28. Accordingly, the elongated surfaces 32 of the various gas-blocking flakes 28 are oriented to be substantially in alignment with the portion of the outer surface 34 of the trim breaker 10 that is proximate the corresponding gas-blocking flake 28. As will be described more fully below, the gas-blocking flakes 28 can be made of mica particles, glass particles, ceramic, combinations thereof, as well as other materials that can resist gas 18 permeation in a flake configuration.

Referring again to FIGS. 1-5, an epoxy coating 40 is applied to a portion of the outer surface 34 of the trim breaker 10. This epoxy coating 40 is typically disposed between a liner channel 42 and a wrapper channel 44. The inner liner 22 and outer wrapper 24 are configured to be received by the liner and wrapper channels 42, 44, respectively. Each of the liner and wrapper channels 42, 44 are substantially filled with an adhesive 46 to hold the inner liner 22 and outer wrapper 24 in place with respect to the trim breaker 10. It is contemplated that the epoxy coating 40 is positioned to extend between the sections of adhesive 46 that are disposed within the liner and wrapper channels 42, 44. In this manner, the interior cavity 20 defined within the structural cabinet 12 is defined by the inner liner 22, the outer wrapper 24, the adhesive 46 and the epoxy coating 40 disposed on the outer surface 34 of the trim breaker 10 that faces the interior cavity 20. Accordingly, the insulating space of the interior cavity 20 is separated from the outer surface 34 of the trim breaker 10 by the epoxy coating 40 as well as the adhesive 46 disposed within the liner and wrapper channels 42, 44.

Referring again to FIGS. 2-10, the trim breaker 10 can be formed by an injection molding process whereby the base material 36, which typically includes a polymer material 60, is infused with gas-blocking flakes 28 to form a substantially homogenous mixture 62 of the polymer material 60 and the gas-blocking flakes 28. This homogenous mixture 62 is injection molded into a mold 64 to form the trim breaker 10. It has been found that during the injection molding process, the gas-blocking flakes 28 tend to align within a direction 66 of a flow 68 of the homogenous mixture 62 of the polymer material 60 and the gas-blocking flakes 28. In this manner, the elongated surfaces 32 of the various gas-blocking flakes 28 will tend to be oriented parallel with the direction 66 of the flow 68 of the homogenous mixture 62 as it moves through the mold 64 for forming the trim breaker 10. This direction 66 of the flow 68 is also typically parallel with the eventual outer surface 34 of the trim breaker 10. By aligning the elongated surfaces 32 of the various gas-blocking flakes 28 with an outer surface 34 of the trim breaker 10, the gas-blocking flakes 28 serve to create a longer path 70 for gas 18 (typically air) that might be able to permeate or pass through the polymer material 60 of the trim breaker 10 and into or out of the interior cavity 20. The gas 18 that may permeate through the polymer material 60 cannot permeate through the gas-blocking flakes 28 and must travel along a more circuitous path 70 around the various gas-blocking flakes 28 to move through the entire trim breaker 10.

According to various aspects of the device, the typical operating conditions for an appliance 14 is at substantially room temperature with subtle variations depending upon climate, weather, and other minor fluctuations. Additionally, during shipping and storage of an appliance 14 during manufacture as well as aftermarket, the appliances 14 within a confined space may experience elevated temperatures in the neighborhood of approximately 65° C. Under these heightened or extreme temperatures, the heated polymer material 60 included within the trim breaker 10 can become more susceptible to damage and gas permeation. If gas 18 permeates through the trim breaker 10, the at least partial vacuum 26 within the interior cavity 20 can degrade, or insulating gasses can escape, and adversely affect the insulating performance of the structural cabinet 12. The inclusion of the gas-blocking flakes 28 assists in preventing this gas permeation through the trim breaker 10. One way that gas-blocking flakes 28 prevent gas permeation is by increasing the distance of the path 70 that gas 18 or other vapor may need to travel through the trim breaker 10 to infiltrate or permeate into, or escape from, the interior cavity 20. By increasing the distance of this path 70 that gas 18 must travel through the trim breaker 10, the adverse effects that may be caused by these extreme temperatures can be mitigated or at least delayed so that storage within these extreme temperatures can be performed for longer periods of time. It is also contemplated that the gas-blocking flakes 28 included within the polymer material 60 can also increase the structural integrity of the trim breaker 10 so that less damage may occur and, in turn, less gas permeation happens through the composite material formed by the homogenous mixture 62 of the polymer material 60 and the gas-blocking flakes 28.

Typically, the amount of gas-blocking flakes 28 that are included within the trim breaker 10 is approximately 10 percent to 40 percent, by volume, of the entire material of the homogenous mixture 62 for the trim breaker 10. These gas-blocking flakes 28 can have a range of sizes that can be from approximately five microns to approximately 800 microns along the elongated surface 32 of the gas-blocking flake 28. It is contemplated that gas-blocking flakes 28 having a range of sizes can be included within the homogenous mixture 62. It is also contemplated that the polymer material 60 that is used within the homogenous mixture 62 for the trim breaker 10 can include a co-polyester material.

In addition to preventing or slowing gas 18 and vapor permeation or transmission through the material of the trim breaker 10, the use of the gas-blocking flakes 28 also slows thermal transmission through the trim breaker 10. Accordingly, the use of the gas-blocking flakes 28 also increases the insulating performance of the trim breaker 10. The gas-blocking flakes 28 also add a structural component to the trim breaker 10 such that the trim breaker 10 under extreme temperatures may experience less expansion and contraction in heat and cold. The use of the gas-blocking flakes 28 within the homogenous mixture 62 of the polymer material 60 and the gas-blocking flakes 28 forms a more structurally robust and stable composition that is better able to withstand temperature extremes and other stresses that may be experienced by the trim breaker 10 for the appliance 14. Typically, the gas-blocking flakes 28 are intended to be uniformly distributed through the material of the trim breaker 10 to form the homogenous mixture 62 that is injection molded into a mold 64 for forming the trim breaker 10.

Referring now to FIGS. 1-7 and 9-10, the trim breaker 10 can be made from various flake-like particles. Such flake-like particles can include, but are not limited to, mica, glass, other ceramic materials, combinations thereof, and other similar materials that can be made into fine flake-like particles or nano flakes. In the case of gas-blocking flakes 28 that are made of glass particles 110, the aspect ratio of each gas-blocking flake 28 (length/thickness) can be within a range of from approximately 100 to approximately 5,000. Additionally, the gas-blocking flakes 28 made of glass particles 110 are much lighter than other types of flakes 28 that may be made of mined materials, such as mica. Because the glass particles 110 are lighter, more glass particles 110 may be included within the homogenous mixture 62, when measured by weight. Additionally, the gas-blocking flakes 28 made of glass particles 110 have been shown to provide greater resistance to permeation of gas 18 through the material of the trim breaker 10. Also, it has been shown that the gas-blocking flakes 28 made of glass particles 110, being a manufactured material, can be made to have significantly greater lengths and widths 90. This greater length and width 90 in glass particles 110 can provide greater resistance to permeation within the trim breaker 10. Additionally, the manufactured glass particles 110 can be made to include substantially consistent sized flakes 28.

Referring again to FIGS. 1-5, in addition to the gas-blocking flakes 28 being disposed within the homogenous mixture 62 that forms the trim breaker 10, an epoxy coating 40 can also be disposed on an outer surface 34 of the trim breaker 10. Typically, this epoxy coating 40 is disposed between the liner channel 42 and the wrapper channel 44 that are defined within the outer surface 34 of the trim breaker 10 that faces the interior cavity 20. In this manner, the epoxy coating 40 extends between adhesive 46 that is disposed within the liner channel 42 and the adhesive 46 that is disposed in the wrapper channel 44. Between the adhesive 46 and the epoxy coating 40, it is contemplated that the trim breaker 10 is sealed from exposure to the interior cavity 20. Accordingly, it is the adhesive 46 and the epoxy coating 40, as well as the metallic material of the inner liner 22 and outer wrapper 24 that define the interior cavity 20 and maintains the integrity of the at least partial vacuum 26 defined within the interior cavity 20. Through this configuration, the inner liner 22, which is typically a metallic inner liner, and the outer wrapper 24, which is also typically a metallic outer wrapper, cooperates with the adhesive 46 and the epoxy coating 40 to define a substantially airtight layer that defines the interior cavity 20 and is able to maintain or substantially maintain the at least partial vacuum 26 within the interior cavity 20.

According to various aspects of the device, the epoxy coating 40 is applied to the trim breaker 10 after the trim breaker 10 is formed, but before the adhesive 46 is applied within the liner channel 42 and the wrapper channel 44. After the epoxy coating 40 is applied and cured, the adhesive 46 can be added to the liner and wrapper channels 42, 44 and the metallic inner liner 22 and the metallic outer wrapper 24 can be installed within the liner channel 42 and the wrapper channel 44 to form the interior cavity 20. The epoxy coating 40 can be painted, sprayed, rolled, dipped, injected, or otherwise disposed on the outer surface 34 of the trim breaker 10 between the liner and wrapper channels 42, 44. As discussed above, the metallic inner liner 22, the metallic outer wrapper 24, the adhesive 46 and the epoxy coating 40 are typically the only surfaces that are exposed to the at least partial vacuum 26 maintained within the interior cavity 20.

Referring now to FIGS. 1-10, having described various aspects of the trim breaker 10 used in the structural cabinet 12, a method 400 is disclosed for forming a trim breaker 10. According to the method 400, gas-blocking flakes 28 are disposed into a polymer material 60 to form an injection molding material that is a substantially homogenous mixture 62 of the polymer material 60 and the gas-blocking flakes 28 (step 402). A mold 64 is also formed that defines a forming cavity 80 (step 404). According to various aspects of the device, the mold 64 includes a plurality of gating structures 82 therein. According to the method 400, the homogenous mixture 62 is injected into the mold 64 via the gating structures 82 (step 406). The gating structures 82 are configured to direct the flow 68 of the injection molding material into and through the mold 64 (step 408). In the various aspects of the device, the gating structures 82 produce a flow 68 of the homogenous mixture 62 of injection molding material into the mold 64 that is substantially parallel with an interior surface 84 of the mold 64 that defines the forming cavity 80. As discussed above, the gas-blocking flakes 28 tend to become oriented so that one of the elongated surfaces 32 of the various gas-blocking flakes 28 is aligned with a direction 66 of flow 68 of the injection molding material. Typically, the largest elongated surface 32 will be aligned in this fashion. In this manner, the gating structures 82 are positioned relative to the mold 64 to produce a flow 68 of the homogenous mixture 62 that is substantially parallel with the interior surface 84 of the mold 64. The plurality of gating structures 82 are positioned around the mold 64 so that when the homogenous mixture 62 of injection molding material is disposed within the forming cavity 80, a plurality of flows 68 of the injection molding material are produced. Each of these flows 68 tends to be in a direction 66 that is substantially parallel with a corresponding portion of the interior surface 84 of the forming cavity 80.

Referring again to FIGS. 1-7 and 9-10, as discussed above, the gas-blocking flakes 28 made of glass particles 110 are significantly lighter than gas-blocking flakes 28 made of mica. Because of this, a flow length of the homogenous material when moved in a flow 68 through a mold 64 can be longer than a flow 68 of material that includes gas-blocking flakes 28. Additionally, because the gas-blocking flakes 28 of glass particles 110 are lighter, the overall weight of the trim breaker 10 is also lighter. Typically, the percent by volume of gas-blocking flakes 28 that are included within the homogenous mixture 62 that forms the trim breaker 10 is typically within a range of from approximately 30 percent by volume to approximately 40 percent by volume. As discussed above, this volume of glass particles 110 is significantly lighter than this volume of gas-blocking flakes 28 made of mica.

Figure 9:
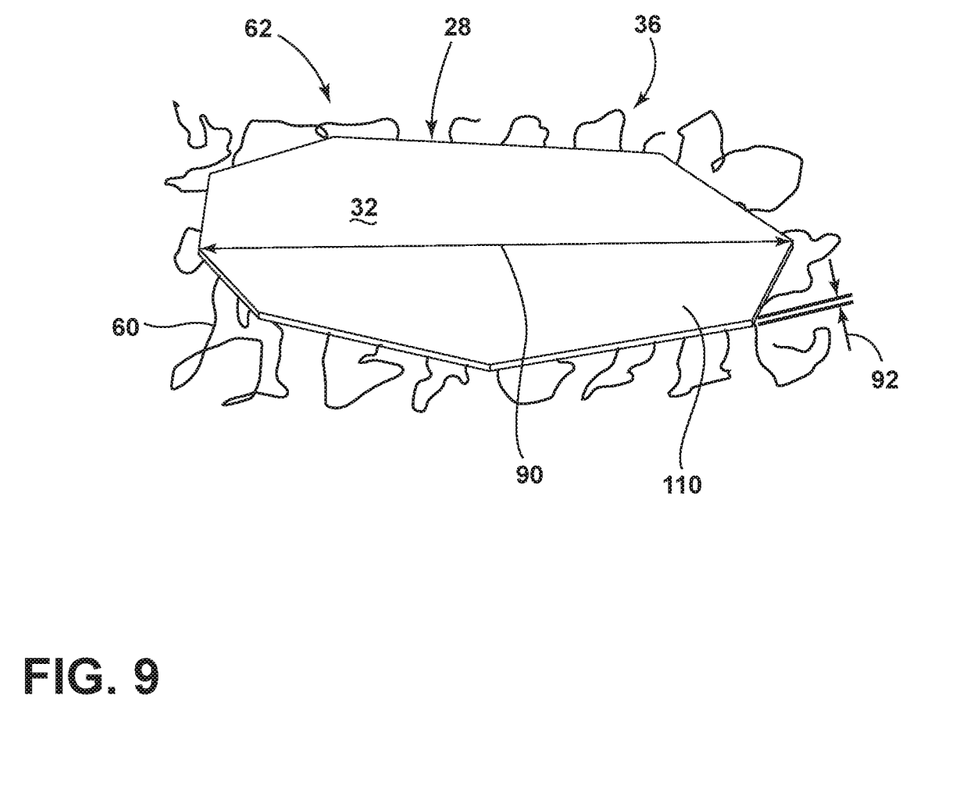
FIG. 9 is a schematic view of a gas-blocking flake disposed within a polymer network for use within an aspect of the trim breaker.
Figure 10:
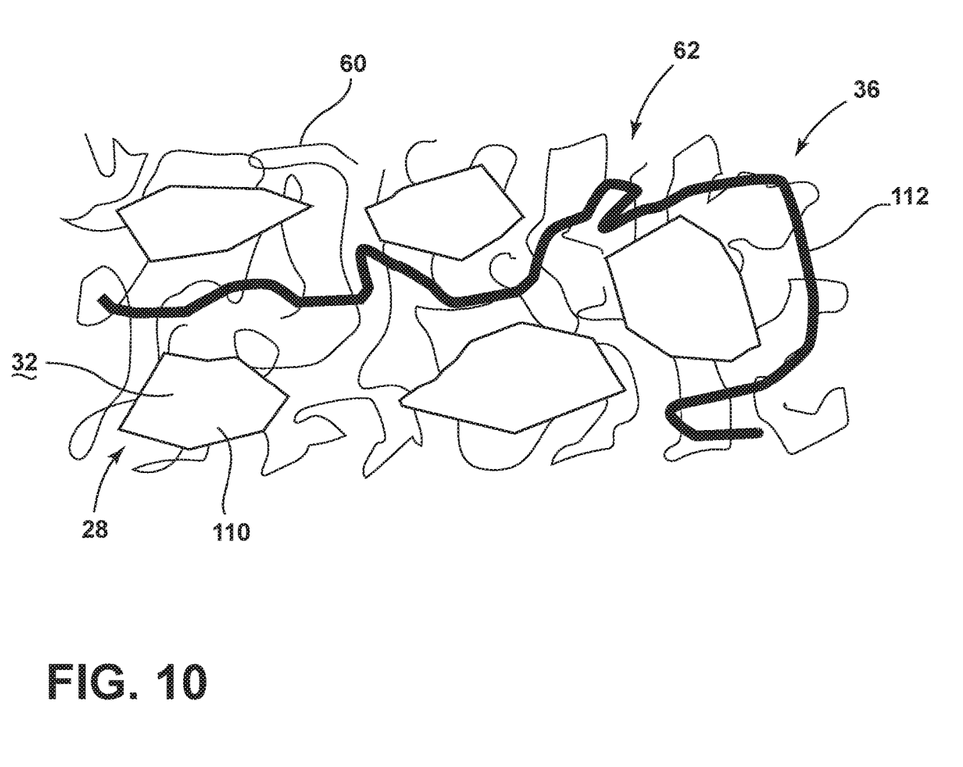
FIG. 10 is a schematic cross-sectional view of a trim breaker showing thin gas-blocking flakes set within a polymer network along with various glass fiber and other silica-like material for creating the trim breaker.

As exemplified in FIGS. 9 and 10, the composite material of gas-blocking flakes 28 and glass particles 110 used in connection with the polymer material 60, such as a polymer network or other plastic material, can be utilized for forming the trim breaker 10. Studies have shown that the gas-blocking flakes 28 made of glass particles 110 have a very high aspect ratio, as discussed above, which provides better gas permeation resistance. Also, because the glass particles 110 are a synthetic material that is manufactured, a high purity of glass is able to be manufactured. Also, relatively consistent sized glass particles 110 can also be formed in a controlled setting. In addition to the high aspect ratio of the gas-blocking flakes 28 of glass particles 110, the glass particles 110 can be manufactured to have a very low thickness 92, such as within a range of from approximately 150 nanometers to approximately 30 nanometers. These properties of the gas-blocking flakes 28 made of glass particles 110 provide better permeation resistance at a variety of temperatures, such as the high temperatures experienced within manufacturing settings, transport settings, storage settings, combinations thereof, and other similar settings that may experience temperature extremes of both heat and cold.

As part of the method 400, step 410 can include applying an epoxy coating 40 to the outer surface 34 of the formed trim breaker 10. As discussed above, this epoxy coating 40 is typically disposed between the liner channel 42 and the wrapper channel 44 that are formed within the trim breaker 10. According to various aspects of the device, the proportion of gas-blocking flakes 28 to the polymer material 60 can be between approximately 10 percent and 40 percent. Studies have shown that a proportion of gas-blocking flakes 28 in a range of approximately 10 percent to approximately 20 percent is effective, as well as a proportion of gas-blocking flakes 28 of between approximately 30 percent and approximately 40 percent. Additionally, in forming the gas-blocking flakes 28, it is contemplated that a flatter aspect ratio of each gas-blocking flake 28 is effective at slowing the air transmission and also slowing thermal transfer through the material of the trim breaker 10. Additionally, gas-blocking flakes 28 having a greater aspect ratio of width 90 to thickness 92 (shown in FIGS. 5 and 9) is also effective at increasing the structural integrity of the trim breaker 10 to resist thermal expansion and contraction. Stated another way, gas-blocking flakes 28 that have a greater aspect ratio or are "flatter" in shape are effective at diminishing the air/vapor transmission and also diminishing the rate of thermal transfer through the material of the trim breaker 10.

Referring again to FIGS. 2-5, the use of the epoxy coating 40 forms an effective barrier between the interior cavity 20 and the trim breaker 10. Additionally, the epoxy coating 40 is a sufficiently robust material that will resist damage that may result from scratching or bumping of an insulating media 100 with the epoxy coating 40. Where various glass spheres, fibrous insulation, glass fiber 112, other silica-based material or other similar insulating material are used within the insulating media 100, these particles 102 of the insulating material can include a highly abrasive characteristic. The use of the epoxy coating 40 limits the effect of these abrasive materials against the trim breaker 10. During deposition of the insulating media 100 as well as during evacuation of the interior cavity 20 to achieve the at least partial vacuum 26, movement may occur within the insulating media 100. By using the epoxy coating 40, this movement of the particles 102 of insulating media 100 is substantially prevented from causing damage. Again, the epoxy coating 40 is a sufficiently robust material that can resist the abrasive qualities of the various components of the insulating media 100.

According to another aspect of the present disclosure, a refrigerator includes an inner liner, an outer wrapper and a trim breaker that extends between the inner liner and the outer wrapper to define an insulated structural cabinet. The trim breaker includes a plurality of gas-blocking flakes, wherein each gas-blocking flake includes a longitudinal axis that extends substantially parallel with an elongated surface of the respective gas-blocking flake. The longitudinal axis and the elongated surface of each corresponding gas-blocking flake is oriented to be substantially parallel with a portion of an outer surface of the trim breaker located near the respective gas-blocking flake.

According to another aspect, the gas-blocking flakes are made of at least one of mica particles and glass particles.

According to yet another aspect, the trim breaker includes a substantially homogenous mixture formed from a base material and the plurality of gas-blocking flakes.

According to another aspect of the present disclosure, the substantially homogenous mixture includes an amount of gas-blocking flakes that is in a range of from approximately 10 percent to 40 percent by volume of the homogenous mixture.

According to another aspect, the plurality of gas-blocking flakes include a range of sizes measured along the longitudinal axis, wherein the range of sizes is from approximately 5 microns to approximately 800 microns.

According to yet another aspect, the base material includes a polymer material.

According to another aspect of the present disclosure, the base material includes at least one of a polymer network and a silica-based material.

According to another aspect, the trim breaker partially defines an interior cavity of the insulated structural cabinet that is maintained at an at least partial vacuum.

According to yet another aspect, an aspect ratio of length to thickness for each respective gas-blocking flake is in a range of from approximately 100 to approximately 5,000.

According to another aspect of the present disclosure, the trim breaker includes an epoxy coating that is disposed on the outer surface of the trim breaker.

According to another aspect, the trim breaker includes a base material that defines an outer surface. A plurality of gas-blocking flakes are integrated into the base material. Each gas-blocking flake of the plurality of gas-blocking flakes includes a longitudinal axis that extends substantially parallel with an elongated surface of the respective gas-blocking flake. The longitudinal axis and the elongated surface of each corresponding gas-blocking flake is oriented to be substantially parallel with a portion of the outer surface of the base material located near the respective gas-blocking flake.

According to yet another aspect, the gas-blocking flakes are made of at least one of mica particles and glass particles.

According to another aspect of the present disclosure, the base material and the plurality of gas-blocking flakes form a substantially homogenous mixture.

According to another aspect, the homogenous mixture includes an amount of gas-blocking flakes that is in a range of from approximately 10 percent to 40 percent by volume of the homogenous mixture.

According to yet another aspect, the plurality of gas-blocking flakes include a range of sizes measured along the longitudinal axis, wherein the range of sizes is from approximately 5 microns to approximately 800 microns.

According to another aspect of the present disclosure, the base material includes at least one of a polymer material and a silica-based material.

According to another aspect, an aspect ratio of length to thickness for each respective gas-blocking flake is in a range of from approximately 100 to approximately 5,000.

According to yet another aspect, an epoxy coating that is disposed on the outer surface of the trim breaker.

According to another aspect of the present disclosure, a method for forming a trim breaker includes disposing gas-blocking flakes into a polymer material to form an injection molding material. A mold is formed that defines a forming cavity, wherein the mold includes a plurality of gating structures. The injection molding material is injected into the mold via the gating structures. A flow of the injection molding material is directed into the mold. The gating structures produce a flow of the injection molding material that is substantially parallel with an interior surface that defines the forming cavity. The flow of the injection molding material produces an aligned configuration of the gas-blocking flakes that is substantially parallel with the interior surface of the forming cavity to define the trim breaker.

According to another aspect, an epoxy coating is disposed on at least a portion of an outer surface of the trim breaker.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width 90 of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. A trim breaker for a vacuum insulated structure, the trim breaker comprising:
    a base material that defines an outer surface;
    a plurality of gas-blocking flakes integrated throughout the base material,
    wherein:
        each gas-blocking flake of the plurality of gas-blocking flakes includes a longitudinal axis that extends substantially parallel with an elongated surface of the respective gas-blocking flake; and
        the longitudinal axis and the elongated surface of each corresponding gas-blocking flake is oriented to be parallel with a portion of the outer surface of the base material located near the respective gas-blocking flake.

2. The trim breaker of claim 1, wherein the plurality of gas-blocking flakes are made of at least one of mica particles and glass particles.

3. The trim breaker of claim 1, wherein the base material and the plurality of gas-blocking flakes form a homogenous mixture.

4. The trim breaker of claim 3, wherein the homogenous mixture includes an amount of gas-blocking flakes that is in a range of from approximately 10 percent to 40 percent by volume of the homogenous mixture.

5. The trim breaker of claim 1, wherein the plurality of gas-blocking flakes include a range of sizes measured along the longitudinal axis, wherein the range of sizes is from approximately 5 microns to approximately 800 microns.

6. The trim breaker of claim 5, wherein an aspect ratio of length to thickness for each respective gas-blocking flake is in a range of from approximately 100 to approximately 5,000.

7. The trim breaker of claim 1, further comprising:
    an epoxy coating that is deposed on the outer surface of the trim breaker.

8. The trim breaker of claim 1, wherein the base material includes a polymer material.

9. The trim breaker of claim 1, wherein the base material includes at least one of a polymer network and a silica-based material.

10. The trim breaker of claim 1, wherein the trim breaker partially defines an interior cavity of an insulated structural cabinet that is maintained at an at least partial vacuum.

11. The trim breaker of claim 1, wherein an aspect ratio of length to thickness for each respective gas-blocking flake is in a range of from approximately 100 to approximately 5,000.

12. A trim breaker for a vacuum insulated structure, the trim breaker comprising:
    a base material that defines an outer surface;
    a plurality of gas-blocking flakes integrated throughout the base material to define a homogenous material,
    wherein:
        each gas-blocking flake of the plurality of gas-blocking flakes includes a longitudinal axis that extends parallel with an elongated surface of the respective gas-blocking flake; and the longitudinal axis and the elongated surface of each corresponding gas-blocking flake is oriented to be parallel with a portion of the outer surface of the base material located near the respective gas-blocking flake.

13. The trim breaker of claim 12, wherein the plurality of gas-blocking flakes are made of at least one of mica particles and glass particles.

14. The trim breaker of claim 12, further comprising:
an epoxy coating that is deposed on at least a portion of the outer surface of the trim breaker.

15. The trim breaker of claim 12, wherein the base material includes at least one of a polymer network and a silica-based material.

* * * * *